(12) United States Patent
Sinquin et al.

(10) Patent No.: US 6,256,738 B1
(45) Date of Patent: Jul. 3, 2001

(54) CLV CARRIER COPY PROTECTION SYSTEM

(75) Inventors: Patrice Sinquin; Philippe Selve; Ran Alcalay, all of Tel-Aviv (IL)

(73) Assignee: Midbar Tech (1998) Ltd., Tel-Aviv (IL)

( * ) Notice: Subject to any disclaimer, the term of this patent is extended or adjusted under 35 U.S.C. 154(b) by 0 days.

(21) Appl. No.: 09/175,255

(22) Filed: Oct. 20, 1998

(51) Int. Cl.$^7$ .................................................. G06F 1/24
(52) U.S. Cl. ........................ 713/194; 713/200; 713/201
(58) Field of Search .................................. 713/194, 200, 713/201, 165, 166, 168

(56) References Cited

PUBLICATIONS

"Compact Disc Digital Audio System." CEI IEC 908 (1987).
"CD–ROM and its Technology." No. 36, pp. 559–660.
"Information Technology—Data Interchange on Read–Only 120 mm Optical Data Disks (CD–ROM)." International Standard, ISO/IEC 10149, Second Edition, (1995).

*Primary Examiner*—Thomas R. Peeso
(74) *Attorney, Agent, or Firm*—Ladas & Parry

(57) ABSTRACT

In a manufacturing process of a continuous linear velocity (CLV) storage medium, a method for rendering a file stored on the CLV storage medium immunized against an unauthorized duplication. The CLV includes a plurality of consecutive blocks, each including a data section and control section. The control section includes an error correction and an error detection code. The blocks are configured in a given format. The method includes the steps of: (a) modifying a portion of the data section in a block so as to constitute modified data section. The modified data constitutes reconfigured format which violates the given format. The method further includes the step of modifying the control section that is associated with the modified data section, such that the error correction and error detection codes match the modified data section.

23 Claims, 5 Drawing Sheets

CLV CARRIER COPY PROTECTION SYSTEM

FIELD OF THE INVENTION

The present invention is in the general field of protecting CD-ROM and the like from piracy copying and unauthorized use.

BACKGROUND OF THE INVENTION

Until recently, removable storage media were predominantly magnetic diskettes such as 5¼ or 3½ inch removable diskette. In order to control unauthorized copying of software, various software based solutions such as specially formatted diskettes, or hardware based solutions such as dongles have been in use. These solutions, generally, barred the possibility of copying an original licensed user application program (stored in the form of one or more files) to different, unauthorized, sites in which they are used freely without the owner's consent. The proposed solutions posed some difficulties in terms of assuring that the protected modules that are incorporated into the user application do not interfere with the normal operation of the protected application, and therefore a significant portion of the computer industry did not adopt them as a standard solution and preferred to rely on legal different approaches such as copyright enforcement. In the past few years the removable medium which serves for storage of user application programs has migrated to CD-ROM which not only is characterized by a larger storage volume as compared to the ancestor magnetic storage medium, but provides an inherent copy protection feature. Thus, a magnetic storage medium such as a diskette can be easily copied by using a conventional operating system utility (e.g. "diskcopy" in the DOS operating system). Conversely, in order to copy a CD-ROM, special equipment is required which, until recently, carried a very high price tag, thus hindering the possibility of circulated copying of the original CD-ROMs. Software developers coudl therefore rely on the fact that in order to exploit their software, an original CD-ROM must be purchased and the likelihood of copying the original CD-ROM is negligible. This situation has recently been changed with the introduction of relatively cheaper CD-ROM copying devices which now facilitate unauthorized copying of CD-ROMs, thereby causing significant financial damages to the software developers. The recent advent of so called DVD (standing for Digital Video Disk) has further aggravated the problem since the latter enables not only to read data but also to write data thereon. Thus, by utilizing conventional DVD driver, files from an original CD-ROM may be copied to a blank DVD carrier and used without the consent of the software developer.

Accordingly, there arises a need in the art to incorporate in an original CLV carrier, means which will hinder the possibility of illegally copying and using part or all of the data stored in the original CLV carriers. CLV carrier, as is well known in the art, stands for Constant Linear Velocity which is the underlying technology shared by CD-ROM carrier, DVD carrier and others.

SUMMARY OF THE INVENTION

The invention provides for:

In a manufacturing process of a continuous linear velocity (CLV) storage medium, a method for rendering at least one file stored on said CLV storage medium immunized against an unauthorized duplication; the CLV includes a plurality of consecutive blocks, each including a data section and control section; the control section includes at least one error correction, and at least one error detection code; said blocks are configured in a given format;

the method comprising the steps of:
  a. modifying at least a portion of the date section in at least one of said blocks so as to constitute modified data section; said modified data constitutes reconfigured format which violates said given format;
  b. modifying the control section associated with said modified data section, such that at least said error correction or said error detection codes substantially match said modified data section.

The invention further provides for a continuous linear velocity (CLV) storage medium having at least one filed stored on said CLV storage medium; the CLV being immunized against an unauthorized duplication; the CLV includes a plurality of consecutive blocks, each including a data section and control section; the control section includes at least one error correction, and at least one error detection code; said blocks are configured in a given format; at least one of said blocks includes modified data in the data section constituting modified data section ; said modified data constituting reconfigured format which violate said given format; the control section associated with said modified data section is modified such that at least said error correction or said error detection codes substantially match said modified data section.

Still further, the invention provides for a real-time error handling procedures associated with a continuous linear velocity (CLV) storage medium having at least one file stored therein; the CLV includes a plurality of consecutive blocks, each including a data section and control section; the control section includes at least one error correction, and at least one error detection code; said blocks are configured in a given format;

the real-time error handling procedure is adapted to executed the following steps, that include:
  a) detecting modified data in the data section of at least one block; said modified data constituting reconfigured format which violate said given format;
  b) checking that the control section associated with said modified data section is modified such that at least said error correction or said error detection codes substantially match said modified data;
  c) in the case that at least the conditions of said steps (a) and (b) are met, classifying said CLV as an original CLV, and otherwise classifying said CLV as an unauthorized duplication.

The invention further provides for a continuous linear velocity (CLV) storage medium having at least one file stored on said CLV storage medium; the CLV being an unauthorized substantially duplication of an original CLV; the CLV includes a plurality of consecutive blocks, each including a data section and control section; the data section of said blocks including a data constituting a file; said file is rendered inoperable since at least a portion thereof accommodated in said original CLV is absent in said unauthorized duplication of said CLV.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1A:
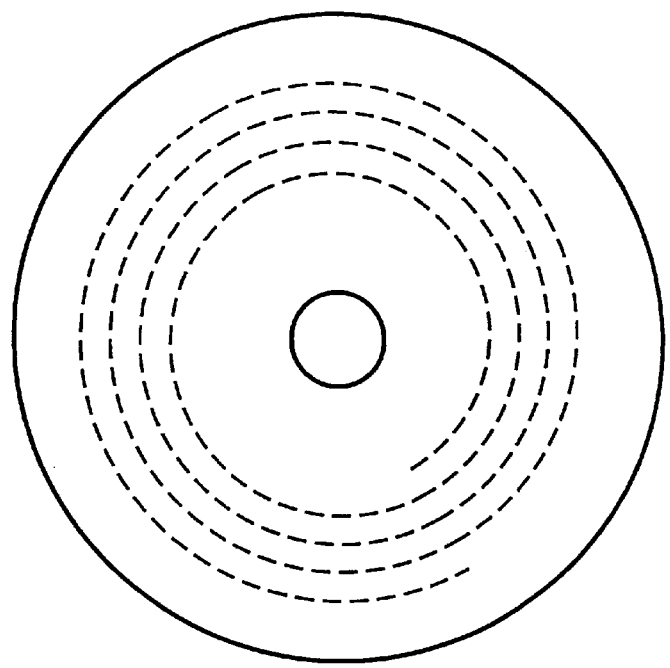
FIGS. 1A-B illustrate schematically typical format configuration of CLV and CAV carrier, respectively.
Figure 1B:
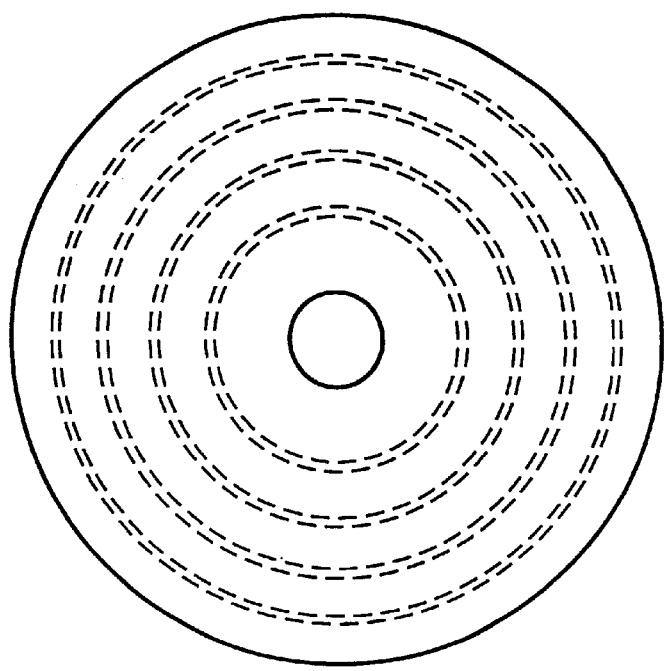

There follows a brief description of the CD-ROM technology which provides a background for understanding the invention. The description below applies mutatis mutandis to other types of CLV carriers such as DVD carrier. Thus, manufacturing of a CD-ROM involves pressing the aluminum layer of the CD in a form of pit (indentation) and land (elevation) which correspond to individual bits of information of the file that is conveyed to the CD-ROM. The pit and land arranged along a single spiral extending throughout the entire CD surface starting from the inner edge of the CD-ROM and ending at the outer edge thereof. Thus, the data is deposited on the CD continuously as opposed to the conventional magnetic storage medium such as magnetic hard drive where data is stored on distinct and separated tracks. The distinction between the format configuration of CD-ROM (belonging to the so called CLV category) and a magnetic hard disk drive configuration belonging to the CAV (Constant Angular Velocity) is illustrated schematically in FIGS. 1A and 1B. As shown, data stored on the CD-ROM (FIG. 1A) may be regarded as one continuous channel which is broken down by sectors, which in turn are broken down by frames.

Figure 2A:
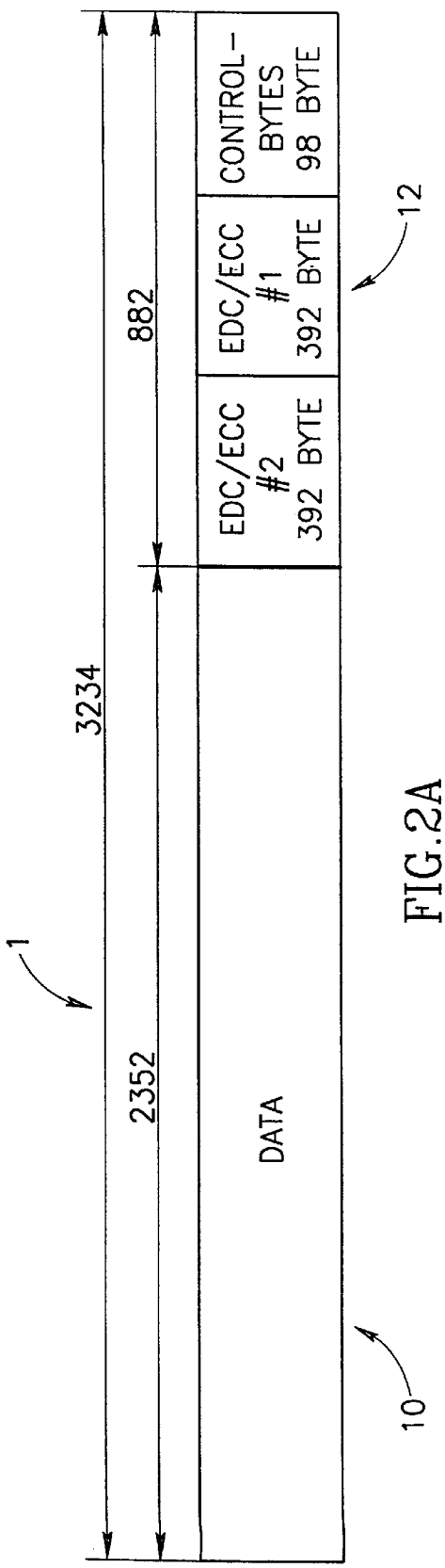
FIGS. 2A-2B illustrate schematically typical structure of a processor sector format at processor level, according to a so called yellow book format.
Figure 2B:
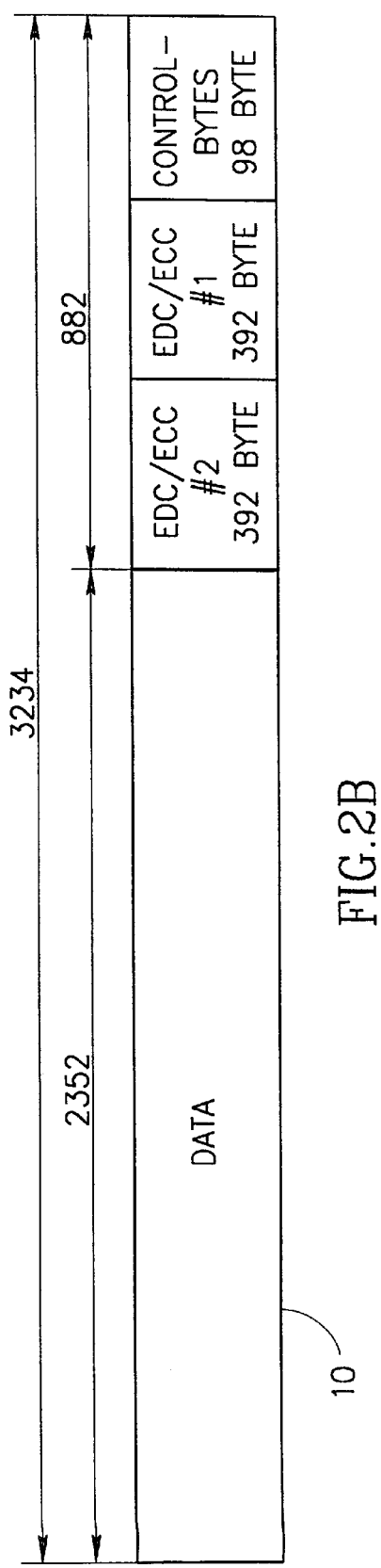

A typical structure of a CD-ROM sector, (according to e.g. yellow book format) is shown in FIGS. 2A and 2B.

FIG. 2A illustrates a so called mode 1 format whereas FIG. 2B represents a so called mode 2 format. The two formats are different in that in the mode 2 format more volume is allocated for storage of data. Thus, whereas in mode 2 format 2336 bytes out of the 3234 bytes (constituting the sector size) are allocated for data, in the mode 1 variant only 2048 bytes are allocated for data.

FIGS. 2A and 2B illustrate a sector format at processor level. As is known to those versed in the art, a sector (at processor level) is mapped to a corresponding block or blocks at the CLV level. The mapping between the processor level format (sector) and the CLV level format (block), is dictated e.g. by the IEC 908 standard. As if further well known, there is no one to one correspondence between the mapping of sectors at processor level to blocks at CLV level. Thus, data that reside in one sector (say a) at the processor level, can be distributed among e.g. three blocks (a,b,c) at CLV level. Obviously, the data section in responsive blocks a,b and c, normally include additional data originated from other processor level sectors, say c and d. Moreover, at processor level the data is naturally represented in binary form (i.e. a stream of data bits) whereas at CLV level the data is represented as a stream of channel bits. For more details as regards mapping, structure and procedure, reference is made to the specified IEC 908 standard.

Reverting now to FIG. 2A, the various fields of the sector (12) (except for the user data section), serve for error detection and correction for enhancing data integrity.

A further discussion in the CD-ROM technology can be found in the Encyclopedia of System Programming by Michael Tischer & Bruno Jennrich Chapter 36 pp. 559–600.

The underlying concept of the invention will be explained with reference to a very simple example illustrated in FIGS. 3a–3b, 4, and also to the flow chart illustrated in FIG. 5.

The invention exploits the behavior of conventional CLV drive readers which operate under predefined operational constraints dictated by e.g. ISO/IEC 10149 or the CEI IEC 908 standard. Thus, according to the specified standard, the data channel bits time in the data section of the sector (e.g. the data section at CLV level which corresponds to data section 10 of the sector (1) in FIG. 2A) cannot exceed a given time limit for a constant data level. For a better understanding of the foregoing, attention is directed to FIGS. 3A and 3B showing two schematic illustrations which serve for explaining the specified stipulation. It should be noted that FIGS. 3A and 3B are depicted for the sake of clarity of explanation only and therefore many details which form part of the actual structure of sectors and blocks are not presented in the schematic illustration of FIGS. 3A and 3B.

Figure 3A:
FIGS. 3A-B are two schematic illustrations which serve for explaining the customized format according to the invention.

Thus, consider a series of bits as depicted in FIG. 3A. As shown the sequence consists of six channel bits ('0' level) followed by six channel bits ('1' level) which, in turn, are followed by a series channel bits ('0' level). According to the invention, the specified series is intentionally altered to a series of nineteen constant channel bits ('0' level), constituted by 6+6+7 as depicted in FIG. 3B. Considering, for sake of discussion, that the threshold, i.e. the maximum permitted channel bits of the same data level corresponds to a series of 11 constant channel bits '1's or '0's ) designated also as 11T, where T stand for a time interval that corresponds to one channel bit). In the latter scenario, the specified series of nineteen '0's is, of course, invalid as it exceeds the permitted threshold and accordingly, when the latter invalid series is encountered, the CLV drive generate an appropriate error code that is read by the associated driver software (at processor level), and in response thereto appropriate error message is invoked to the user e.g. Abort/Retry/Ignore?

The specified the pre-defined operational constraint of the CLV driver is utilized for accomplishing a so called customized format as will be described with reference also to FIG. 4. Considering, for example, an application program that should be transferred to a CD-ROM of the kind depicted in FIG. 5. The application program extends over four sectors (0,1,3, and 4) using in each sector all or almost all the data space of the 2352 bytes (according e.g. to the format of FIG. 2B). Sector number 2 is a so called modified sector in which the 2352 bytes are "logically" partitioned to portions (41) and (42) all, (or at least a portion thereof) includes data that forms part of the specified application program. According to another embodiment, all of the data that resides in areas (41) and (42) do not belong to the application program. Sector number 2 also includes area (40) that is subject to the modification of the kind depicted in FIGS. 3A and 3B.

As expected (see also FIG. 5), the application program is converted to a CD format (51) of the invention (see below) and is fed to known per se CD stamper (53) so as to eventually bring about consecutive block arrangement 0–4 in FIG. 5.

Reverting now to step (52), area (400 is subject to modification as described with reference to FIGS. 3A and 3B. Thus, a sequence of unused data in area (40) is converted from a valid format representative (e.g. of FIG. 3A) to an invalid format (e.g. of FIG. 3B). The format configuration step (52) further includes modifying the error correction/error detection fields in the control section (12) of the block 2 (in FIG. 5) such that the error correction/detection codes corresponds to the configured data (taking into account the altered section (40)).

Thus, considering the known Cross-Interleave Reed-Solomon code, the specified error correction modification means that it is applied to the data section of sector number 2 whilst ignoring the modified section (40). In fact, considering that the calculation is inherently performed at a frame boundary, the frame (hereinafter modified frame)—being normally 33T long—that includes the modified section (40)) is ignored in the modified error correction. Thus, for example, if normal sector includes 98 frames and the Reed Solomon error correction code is normally applied to the 98 frames, according to the modified error correction the modified error correction ignores the modified frame and consequently the code is applied only to only 97 frames.

Put differently, the error correction code is modified such that from the standpoint of the error correction/detection codes, the data of sector 2 (whilst ignoring the modified area (40)) is correct. It is accordingly appreciated that not only the data section is altered in a given block (or blocks) but also the corresponding error correction and/or error detection codes are altered so as to match the altered data.

The calculation of error correction detection is known per se and therefore will not be expounded upon herein.

As will be explained in greater detail below, the resulting configuration of blocks in the original CD-ROM (as depicted e.g. in FIG. 4) hampers successful copying for producing a pirate copy of the original CD-ROM.

A typical, yet not exclusive example of how the pirate copy is rendered practically inoperable is given below. Thus, the copying device that is utilized for copying the original CD-ROM carrier (e.g. Phillips 4×2 CD write) scans each of the sectors in the original carrier and copies it "as is" to the target CD-ROM. Accordingly, (see also FIG. 6), the first sector number 0 is copied "as is" to the target CD-ROM, i.e. placed at sector 0 of the target CD-ROM. In a similar fashion, sector number 1 is copied to the target CD-ROM. Next, when the laser beam of the copying utility scans sector number 2 on the original medium, it encounters unintelligible data in part (40) that constitute the reconfigured format. It is recalled that the reconfigured format as depicted e.g. in FIG. 3B, violates the operational specification of the CD-ROM format. Accordingly, the associated driver circuitry of the laser beam is, obviously, unable to decipher the data "read" from area (40) of block 2 and, accordingly, an error code is generated which normally leads to an error message, e.g. Abort/Retry, or Ignore that is prompted to the user. Of course, if the user selects the Abort option, the target CD-ROM does not include all the original data since sectors numbers 3 and 4 have not been copied to the target carrier. If, on the other hand, the user decides to continue, e.g. by selecting the Ignore option, the beam moves to the next sector in the original carrier (i.e. the third sector) and the latter is copied "as is" to the target carrier.

Figure 6:
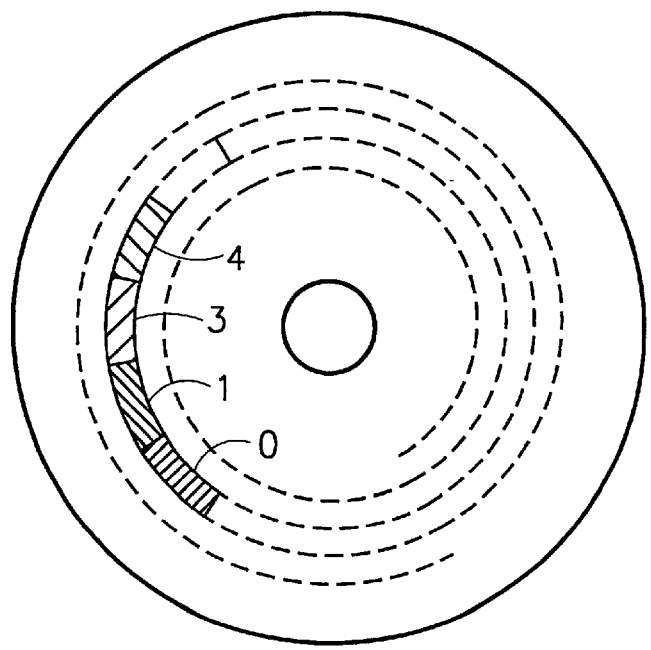
FIG. 6 illustrates schematically a counterpart configuration in an illegitimate CLV carrier copy as produced by utilizing a conventional CLV copying utility.

This sector is copied to the next available place in the target medium. The last sector number 4, is then copied to the following place in the target carrier, i.e. sector number 3. The resulting configuration of the copied CD-ROM carrier is illustrated in FIG. 6.

It is accordingly appreciated that in the target CD-ROM, the original block 2 is absent. Block 2 includes the reconfigured format section (40), however it also includes in areas (41) and (42) which according to one embodiment includes valid data which originates from one or possible more than one sector in the processor level. As recalled (see FIG. 3), one or possibly more than one sector can "contribute" data to one block.

For a better understanding of the foregoing, the sequence of operation of the laser beam when scanning the target (pirate) CD-ROM carrier is now described. Thus, after having read the data residing in block number 0, the beam moves to sector number 1, and reads the data from block number 1. Now, the beam moves to the next block, number 3, in the target CD-ROM, and afterwards to block no. 4. The net effect is that in pirate copy data is read from block numbers 0, 1, 3 and 4.

Assuming that for normal operation of the user application program, the data should be read serially from blocks 0, 1, 2, 3 and 4 (ignoring of course the reconfigured format section (40) and the data in areas (41) and (42) that does not form part of the application program. It readily arises that in the target CD-ROM, due to the absence of vital data (that reside in area (41) and (42) of the original carrier, but not at the target carrier), a program malfunction will be generated and the operation of the target CD-ROM will fail. The malfunction operation of the target CLV in the case that all the data that resides in areas (41) and (42) will be described below.

The successful operation of the original CLV carrier will now be described. It should be noted that for the purpose of successful operation a conventional run time procedure that handles hardware errors is replaced by a customized run-time procedure whose operation will be described below, with reference also to FIG. 7 that illustrates a generalized flow chart of a run-time procedure, according to one embodiment of the invention.

Figure 3B:
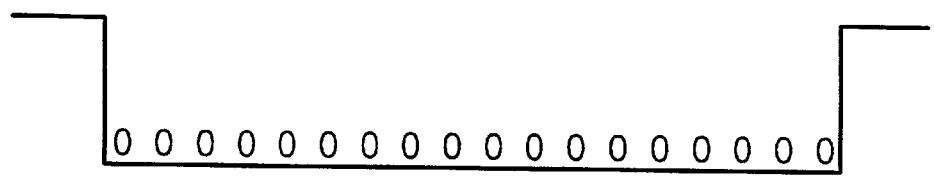
Figure 4:
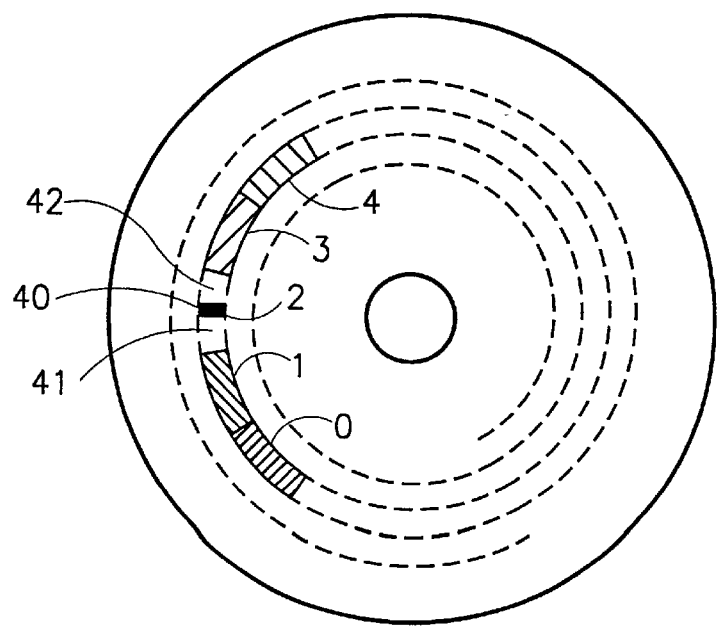
FIG. 4 illustrates schematically a CLV configuration in an original protected CLV carrier.

Thus, during normal course of operation, blocks 0 and 1 are read in a conventional manner and when block 2 is read, a drive error is generated in (e.g. un-recovered read error of MEDIUM ERROR/HARDWARE ERROR type) in response to encountering the specified reconfigured format of the kind depicted e.g. in FIG. 3B.

Figure 7:
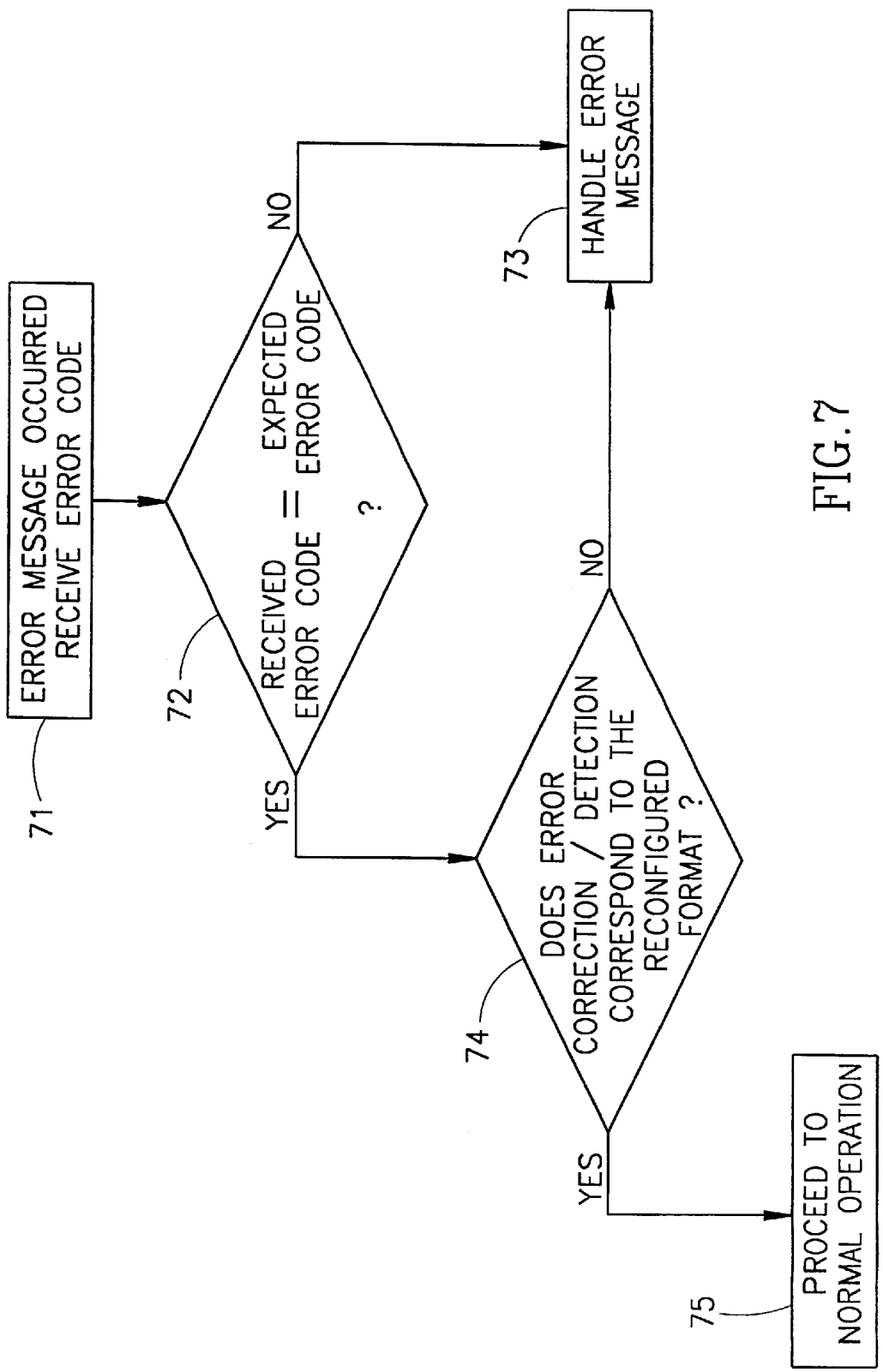
FIG. 7 illustrates a generalized flow chart of a run-time procedure, according to one embodiment of the invention.

The specified error is intercepted by a customized run-time procedure of the kind illustrated as a flow chart of FIG. 7.

The customized run-time procedure receives as an input the error code of the drive error (71) and compare it to the expected error code (72). The expected error code is the specified MEDIUM ERRO/HARDWARE ERROR type and it occurs due to violation of the authorized time channel duration as prescribed by the specified standard. In the case that the received error code is not the expected one (e.g. due to a different hardware failure), the error code is forwarded to the conventional service that handles errors (73).

If, on the other hand, the expected error code is received, then the correctness of the error correction and/or detection code(s) is checked. In other words, the error correction/detection code should, as explained in detail above, match the modified data, ignoring the customized frame.

In the case of affirmative result (75), this indicates that the so encountered error is indeed the customized format of the invention since "the expected" error has been encountered by the CLV driver and this error has been intentionally introduced as readily arises form the fact that the error correction/detection codes match the modified data. If desired additional check may confirm the location of the customized frame which is of course a prior known to the customized run-time procedure.

Figure 5:
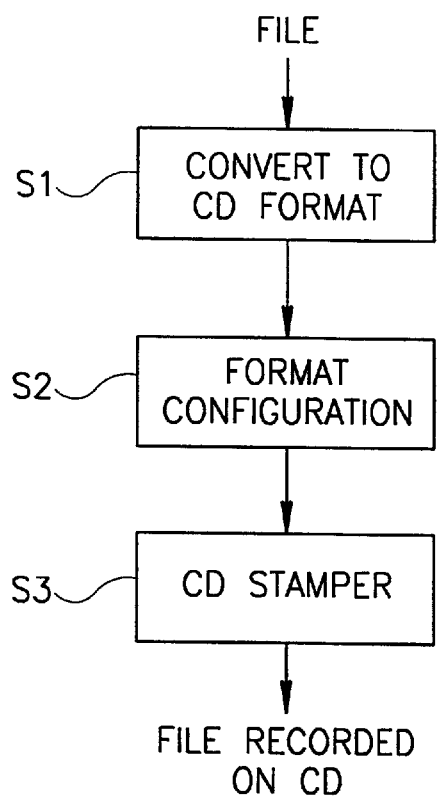
FIG. 5 illustrates a typical sequence of operation for manufacturing a protected CLV carrier according to the invention.

What remains to be done is simply to skip or discard the erroneous data (that originate from area (40) and to continue and process the remaining data of the specified sector (e.g. the data originated from area (42)—see FIG. 5) so as to complete and scan the data of block number 2. Next, blocks numbers 3 and 4 are read and processed. Processing includes for example, moving the sections in area (41) and (42) that belong to the original application and discarding the rest of the data. Discarding may include e.g. overwriting the latter data by NOP operation thereby not interfering with the operation of the original application. The processing operation is not limited to the latter example. The net effect is that all the data that reside in the CLV carrier and which belong to the original application is not affected such that the original application can be successfully executed.

Reverting now to step (74), and in the case of negative result, this indicates that the error whilst being of the expected type has not been intentionally introduced for the purpose of identifying original CLV, and therefore control is transferred to the convention handling treatment utility.

Reverting now to the second type of block customized where none of the frames belong to the original application, this seemingly poses problems in hampering the operation of the pirate copy, since the data of the application program resides only in sectors 0,1,3, and 4 (in sector 2 only customized data is accommodated). This being the case and considering that sectors 0,1,3, and 4 were all copied to the target CLV, there appears to be nothing that stops successful operation of the target copy. To this end, the customized run-time operation tracks the reading of the sectors. Thus, the customized run-time procedure is aware of the fact that the third sector should contain error (i.e. customized frame or frame). Since, however in the pirate copy the third sector that is read is a perfect sector (number 3) and no error occurs, the run-time procedure concludes that this is not an original copy (where and error must occur) and it blocks the operation of the application using any one of many possible manners (e.g. introducing inoperable execution code, triggering an error message etc.)

The present invention is, of course, not bound to the specified embodiment described with reference to FIGS. 3 to 7, and accordingly, by way of non-limiting example, more than one block may be subject to the customized format modification of the invention. If desired, customized formats may be dispersed in various areas in the block or blocks. Moreover, not only executable files are protected in the manner specified, but also (or alternatively) other types of files such as data files application processible files (such as spreadsheet Excel files) and/or other files may be affected in the manner specified above, in order to render them inoperable.

Whilst the above description focused predominantly in a CD-ROM type CLV carrier, the proposed technique applied, mutatis mutandis, to other types of CLV carriers such as DVD Rams.

The present invention has been described with a certain degree of particularity but it should be understood that various alterations and modifications may be performed, without departing from the spirit or scope of the invention as herein claimed.

What is claimed is:

1. In a manufacturing process of a continuous linear velocity (CLC) storage medium, a method for rendering at least one file stored on said CLV storage medium immunized against an unauthorized duplication; the CLV includes a plurality of consecutive blocks, each including a data section and control section; the control section includes at least one error correction, and at least one error detection code; said blocks are configured in a given format;

the method comprising the steps of:
(a) modifying at least a portion of the data section in at least one of said blocks so as to constitute modified data section; said modified data constitutes reconfigured format which violates said given format;
(b) modifying the control section associated with said modified data section, such that at least said error correction or said error detection codes substantially match said modified data section.

2. The method of claim 1, wherein said reconfigured format includes extended time duration that exceeds a specified threshold.

3. The method according to claim 1, wherein said CLV storage medium is a DVD carrier.

4. The method according to claim 1, wherein said CLV storage medium is CD-ROM carrier.

5. The method according to claim 1, wherein said files are selected, each, from a group which includes executable file, data file, application processible file.

6. A continuous linear velocity (CLV) storage medium having at least one file stored on said CLV storage medium; the CLV being immunized against an unauthorized duplication; the CLV includes a plurality of consecutive blocks, each including a data section and control section; the control section includes at least one error correction, and at least one error detection code; said blocks are configured in a given format; at least one of said blocks includes modified data in the data section constituting modified data section; said modified data constituting reconfigured format which violate said given format; the control section associated with said modified data section is modified such that at least said error correction or said error detection codes substantially match said modified data section.

7. The CLV of claim 6, wherein said modified data includes extended time duration that exceeds a specified threshold.

8. The CLV of claim 6, being a DVD carrier.

9. The CLV of claim 6, being a CD-ROM carrier.

10. The CLV of claim 6, wherein said files are selected, each, from a group which includes executable file that includes application program, data file, application processible file.

11. The method of claim 1, wherein said modified data is spread in at least one frame of said block, contituting at least one customized frame.

12. The method of claim 11, wherein at least some frames in said block, other than said customized, belong to an application program.

13. The CLV carrier according to claim 6, wherein said modified data is spread in at least one frame of said block, constituting at least one customized frame.

14. The CLv carrier of claim 13, wherein at least some frames in said block, other than said customized frames, belong to an application program.

15. A real-time error handling produce associated with a continuous linear velocity (CLV) storage medium having at least one file stored therein; the CLV includes a plurity of consecutive blocks, each including a data section and control section; the control section includes at least one error correction, and at least one error detection code; said blocks are configured in a given format;

the real-time error handling procedure is adapted to executed the following steps, that include:
a) detecting modified data in the data section of at least one block; said modified data constituting reconfigured format which violate said given format;
b) checking that the control section associated with said modified data section is modified such that at least said error correction or said error detection codes substantially match said modified data;
c) in the case that at least the conditions of said steps (a) and (b) are met, classifying said CLV as an original CLV, and otherwise classifying said CLV as an unauthorized duplication.

16. The real-time error handling procedure of claim 15, wherein said modified data includes extended time duration that exceeds a specified threshold.

17. The real-time error handling procedure of claim 15, wherein said CLV carrier being a DVD carrier.

18. The real-time error handling procedure of claim 15, wherein saud CLV carrier being a CD-ROM carrier.

19. The real-time error handling procedure of claim 15, wherein said files are selected, each, from a group which includes executable file that includes application program, data file, application processible file.

20. The real-time error handling procedure of claim 15, wherein said modified data is spread in at least one frame of said block, constituting at least one customized frame.

21. The real-time error handling procedure of claim 15, wherein at least some frames in said block, other than said customized frames, belong to an application program.

22. A continuous linear velocity (CLV) storage medium having at least one file stored on said CLV storage medium; the CLV being an unauthorized substantially duplication of an original CLV; the CLV includes a plurality of consecutive blocks, each including a data section and control section; the data section of said blocks including a data constituting a file; said file is rendered inoperable since at least a portion thereof accommodated in said original CLV is absent in said unauthorized duplication of said CLV.

23. The CLV of claim 22, wherein said file is selected from a group which includes executable file that includes application program, data file, application processible file.

* * * * *